United States Patent [19]

Nishizawa

[11] Patent Number: 5,707,134
[45] Date of Patent: Jan. 13, 1998

[54] VEHICULAR LAMP

[75] Inventor: Takaaki Nishizawa, Shizuoka, Japan

[73] Assignee: Koito Manufacturing Co., Ltd., Tokyo, Japan

[21] Appl. No.: 682,314

[22] Filed: Jul. 17, 1996

[30] Foreign Application Priority Data

Jul. 18, 1995 [JP] Japan ................................ 7-203984

[51] Int. Cl.$^6$ ................................................ B60Q 1/04
[52] U.S. Cl. ........................... 362/66; 362/61; 362/289; 362/428
[58] Field of Search ............................ 362/66, 287, 61, 362/427, 285, 80, 289, 419, 418, 428

[56] References Cited

U.S. PATENT DOCUMENTS

| 4,707,768 | 11/1987 | Ball .................................. 362/66 |
| 4,931,912 | 6/1990 | Kawakami et al. ................ 362/61 |
| 5,032,964 | 7/1991 | Endo et al. ....................... 362/61 |
| 5,119,276 | 6/1992 | Suzuki ............................. 362/61 |
| 5,138,532 | 8/1992 | Shirai et al. ..................... 362/66 |
| 5,444,603 | 8/1995 | Otsuka et al. ................... 362/289 |
| 5,496,006 | 3/1996 | Kulka et al. ..................... 362/61 |
| 5,530,629 | 6/1996 | Uehara ............................ 362/66 |

*Primary Examiner*—Thomas M. Sember
*Attorney, Agent, or Firm*—Sughrue, Mion, Zinn, Macpeak & Seas, PLLC

[57] ABSTRACT

A vehicular lamp including a reflector, a member for tiltably supporting the reflector, and an aiming screw for driving the reflector to tilt by rotating. The aiming screw serves as a shaft member linking to the reflector supporting member by a so-called rotation pair, while linking to the reflector by a so-called screw pair. The reflector is formed with an aiming screw stopper which comes into abutment against a tip end part of the aiming screw when the reflector tilts up to a predetermined angle position thereby to inhibit the reflector to tilt beyond the predetermined angle.

20 Claims, 7 Drawing Sheets

VEHICULAR LAMP

BACKGROUND OF THE INVENTION

1. Field of the Invention

The present invention relates to a lamp for vehicles such as an automobile and, more particularly, to an aiming mechanism of a reflector thereof.

2. Related Art

Generally, a vehicular lamp such as a headlamp, a foglamp or the like is provided with an aiming mechanism for adjusting the illumination angle of reflected light beam.

In the conventional aiming mechanism, there has been known two types, that is, an aiming mechanism of a reflector movable type and an aiming mechanism of a unit movable type. The aiming mechanism of the reflector movable type is employed for lamps of a type in which an outer lens is coupled to a lamp body and drives to tilt a reflector housed in a chamber defined by the outer lens and the lamp body. On the other hand, the aiming mechanism of the unit movable type is employed for lamps of a type in which an outer lens is coupled to a reflector and drives to tilt both the reflector and the outer lens as a unit. Both types of the conventional aiming mechanism is provided with an aiming screw structured as described hereinbelow.

That is, an aiming screw serving as a shaft member is coupled by a so-called rotation pair linkage to a support member, i.e., a lamp body or a lamp housing, for supporting the reflector and also coupled by a so-called screw pair linkage to the reflector, so that the reflector is operated to tilt by rotating the aiming screw.

By the way, because of the need from the viewpoint of the light distribution characteristics of lamps or the like, in some arrangements, it is not desirable to tilt the reflector exceeding a certain angle in a certain direction. For example, with foglamps, the reflector should not be tiltable up to direct the optical axis of the reflector upward from the horizontal line as the aiming adjustment may not be appropriately operated.

In order to eliminate the foregoing problem, the aiming mechanism employing the aiming screw has been conventionally designed to have an aiming restriction structure as described below.

That is, an aiming screw is designed to have a major part and a threaded part at the tip end side thereof, and a diameter of the threaded part is smaller than that of the major part to thereby form a step part on the boundary of the major part and the threaded part. Owing to this structure, when the aiming screw is rotated for a certain amount in the tightening direction, the step part of the aiming screw comes into abutment against the reflector thereby to inhibit the further tilting action of the reflector. In this context, generally, the screw pair linkage of the aiming screw to the reflector is not accomplished directly but through a self-locking nut to achieve smooth linkage.

However, the conventional aiming restriction structure as disclosed above suffers from the following deficiency.

During the operation for linking the aiming screw to the reflector supporting member via the rotation pair, a positioning member such as a push-on fix or the like is coupled on the aiming screw from the tip end part to the base part thereof. In order to smoothly operate the coupling, a step part 2a of the aiming screw 2 is tapered as shown in FIG. 7A. On the other hand, an insert side end part 4a of the self-locking nut 4 is also tapered to aid the smooth coupling.

When the aiming screw 2 is rotated for a certain amount in the tightening direction, the self-locking nut 4 comes into abutment against the step part 2a of the aiming screw 2 as shown in FIG. 7B. However, because both the parts which abut against each other are tapered, if the aiming screw 2 is further rotated strongly, the self-locking nut 4 must deform and expand to run over the tapered step part 2a of the aiming screw 2 as shown in FIG. 7C. As a result, the reflector may tilt beyond the predetermined acceptable angle. Therefore, the conventional aiming restriction structure has not been sufficient and needed for an improvement.

SUMMARY OF THE INVENTION

The present invention was made in view of the foregoing deficiency accompanying the conventional aiming restriction structure as described above. Accordingly, an object of the present invention is to provide a vehicular lamp having an aiming restriction structure capable of sufficiently inhibit a reflector to tilt beyond a predetermined acceptable angle when an aiming screw rotates to drive the reflector.

The above and other objects can be accomplished by a provision of a reflector which is formed with an aiming screw stopper.

More specifically, a vehicular lamp according to the present invention includes a reflector, a member for tiltably supporting the reflector, an aiming screw for driving the reflector to tilt by rotating, the aiming screw serving as a shaft member linking to the reflector supporting member by so-called a rotation pair while linking to the reflector by so-called a screw pair, and the reflector being formed with an aiming screw stopper which comes into abutment against a tip end part of the aiming screw when the reflector tilts up to a predetermined angle position thereby to inhibit the reflector to tilt beyond the predetermined angle.

The reflector supporting member is not limited to a specific structure as long as it has a function to tiltably support the reflector. For example, in a case where the lamp employs the aiming mechanism of a reflector movable type, a lamp body performs as the reflector supporting member. On the other hand, in a case where the lamp employs the aiming mechanism of a unit movable type, a lamp housing performs as the reflector supporting member.

The rotation pair linkage disclosed above is a linkage structure of a free rank 1 which allows only a rotational motion along an axis, whereas the screw pair is a linkage structure of a free rank 1 which allows only a spiral motion along an axis.

The tilting direction of the reflector is not limited to one specific direction but includes up-down, left-right and inclined directions.

Further, the aiming screw stopper disclosed above is not limited to a specific arrangement as long as it has a function to inhibit the further tilting motion of the reflector by abutting against the tip end part of the aiming screw. For example, the aiming screw stopper may be formed either integrally or separately with the reflector, and the structure, configuration and the position of the aiming screw stopper are freely designed. If a compact lamp should be designed, the aiming screw stopper may be desirably disposed on a back surface of a reflective surface forming part of the reflector. Further, in order to enhance the aiming restriction function, the aiming screw stopper is desirably designed to be formed on a plane substantially perpendicular to the axial direction of the aiming screw.

As described above, according to the present invention, when a reflector tilts up to a predetermined acceptable angle position, an aiming screw stopper formed on the reflector comes into abutment against a tip end part of an aiming screw to prevent the reflector from further tilting beyond the predetermined acceptable angle position. Therefore, the reflector is sufficiently inhibited to tilt beyond the predetermined acceptable angle when the aiming screw rotators to drive the reflector.

Owing to the structure of the invention, an optical axis of the reflector can be precluded from directing to an undesirable direction due to the excessive tilting motion of the reflector. For example, in case of a lamp a reflector of which is vertically tiltable, the predetermined acceptable angle position is determined on a predetermined upper limit angle position at which the optical axis of the reflector does not direct upward, so that the reflector is sufficiently inhibited to emit light beam directing upward even slightly during the aiming operation. Accordingly, the present invention works effectively particularly in a case where a reflector is used for a foglamp. Further, in case of the foglamp, if an aiming screw stopper is formed on a back side of a reflective surface forming part of the reflector, a compact lamp having the sufficient aiming restriction function can be achieved even though the foglamp is housed in an extremely small space such as in a bumper or a lower part of the bumper of an automobile.

Moreover, the aiming restriction structure according to the present invention is advantageous not only in meeting the demand from the view of the light distribution characteristics, but also in improving the workability during the aiming operation of lamp. That is, since the reflector is prevented from tilting further beyond the predetermined acceptable angle position by abutting the aiming screw stopper against the tip end part of the aiming screw, the abutment position may be determined as a reference angle position for the aiming adjustment operation. In this case, after rotating the aiming screw until when the tip end part of which once abuts against the aiming screw stopper, the aiming screw is rotated reversely while recognizing the abutting position as a reference angle position, so that the optical axis of the reflector can be adjusted to direct to a desired angle position. For the structure, an automatic aiming adjustment can be accomplished.

Furthermore, according to the present invention, it is easy to change the predetermined angle position where the aiming screw stopper abuts against the tip end part of the aiming screw by varying the length of the aiming screw. Hence, for example, even though the regulation which requires angle range for aiming adjustment is different in each destination where the lamp is used, it is easy to meet the requirement in each regulation by preparing different length of the aiming screw for the respective destination.

According to the present invention, the material of the reflector is not limited to steel plate, FRP or die casting material. When the die casting material is used for forming the reflector, the following effect can be obtained.

If a reflector is formed by die casting, an accurate aiming screw stopper having high rigidity can be formed integrally with the reflector. That is, the aiming screw stopper can be formed accurately to have a plane substantially perpendicular to an axis of the aiming screw. Further, since the aiming screw stopper has high rigidity, the aiming screw stopper would be hardly ground down by the aiming screw even if the aiming screw is further rotated strongly after coming into abutment against the aiming screw stopper. For this reason, the reflector can be prevented further assuredly from tilting further beyond the predetermined acceptable angle position.

DESCRIPTION OF THE PREFERRED EMBODIMENTS

The present invention will now be described with reference to accompanying drawings.

Figure 1:
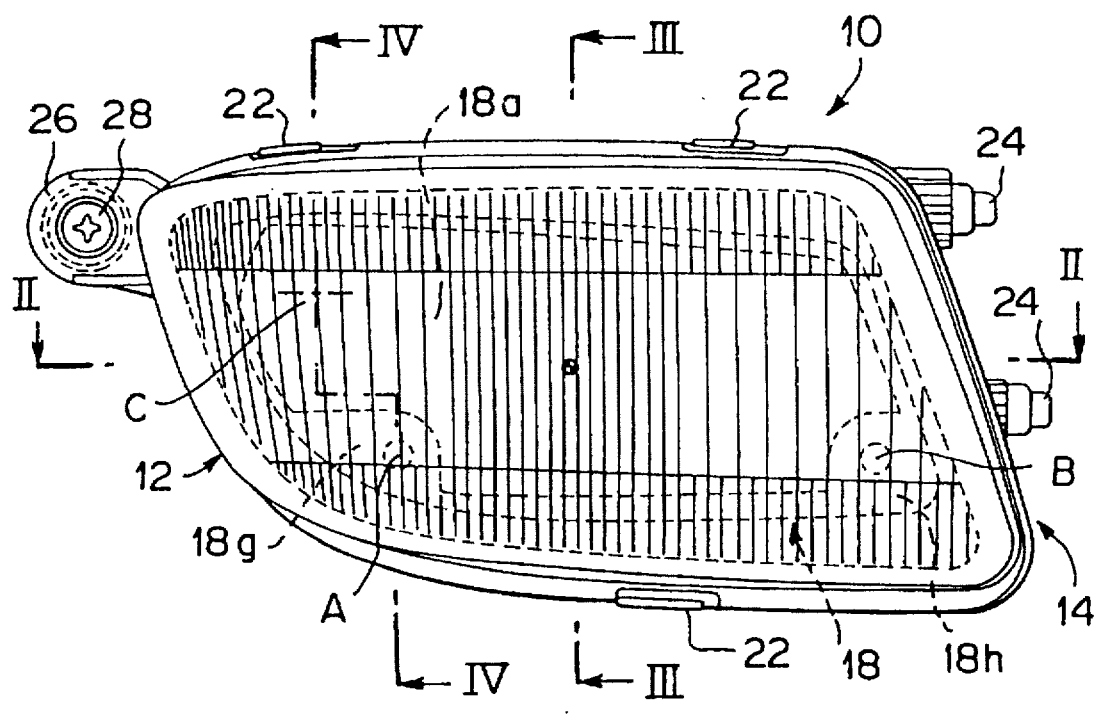
FIG. 1 is a front view showing a vehicular lamp according to one embodiment of the present invention.
Figure 2:
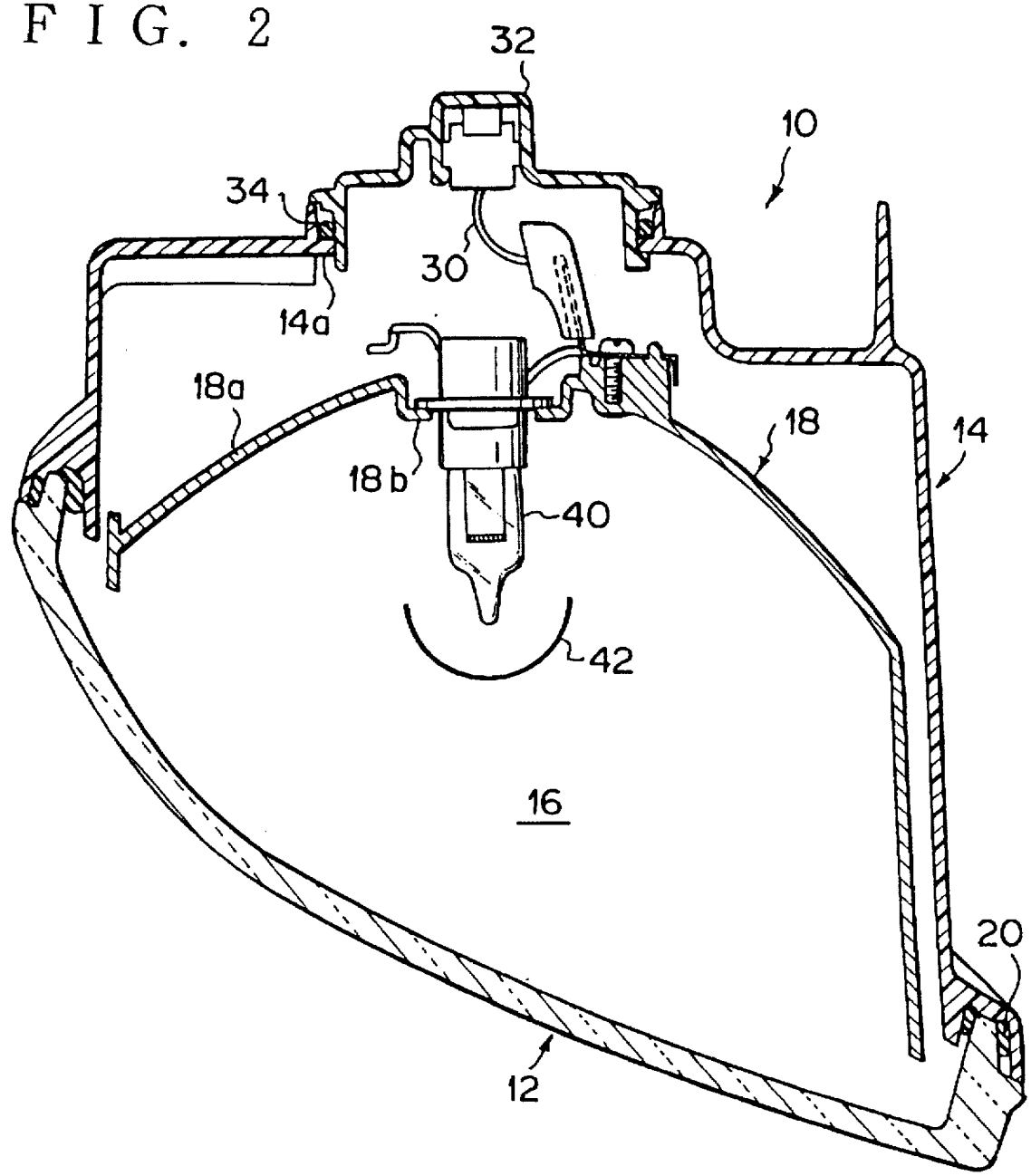
FIG. 2 is a sectional view of the vehicular lamp shown in FIG. 1 cut along a line II—II.
Figure 3:
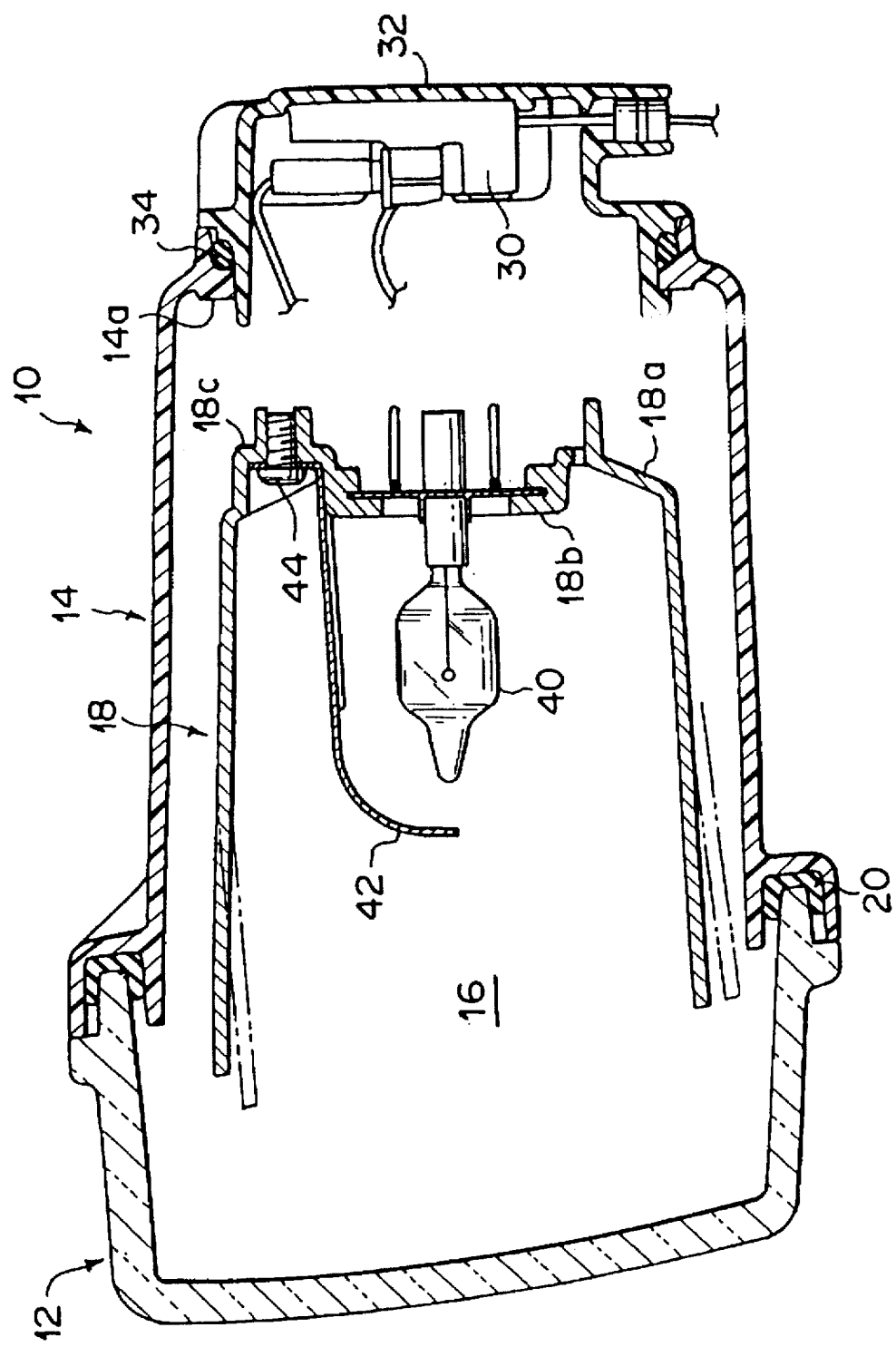
FIG. 3 is a sectional view of the vehicular lamp shown in FIG. 1 cut along a line III—III.
Figure 4:
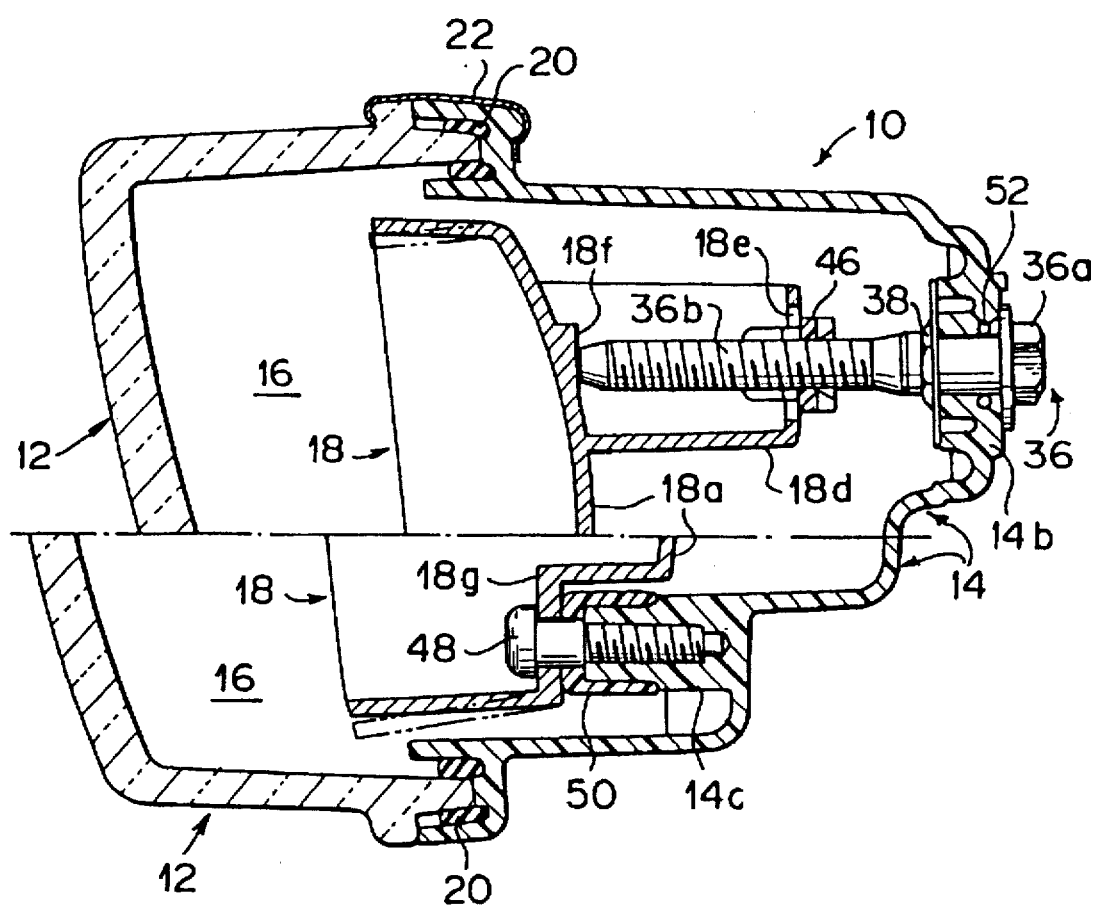
FIG. 4 is a sectional view of the vehicular lamp shown in FIG. 1 cut along a line IV—IV.
Figure 5:
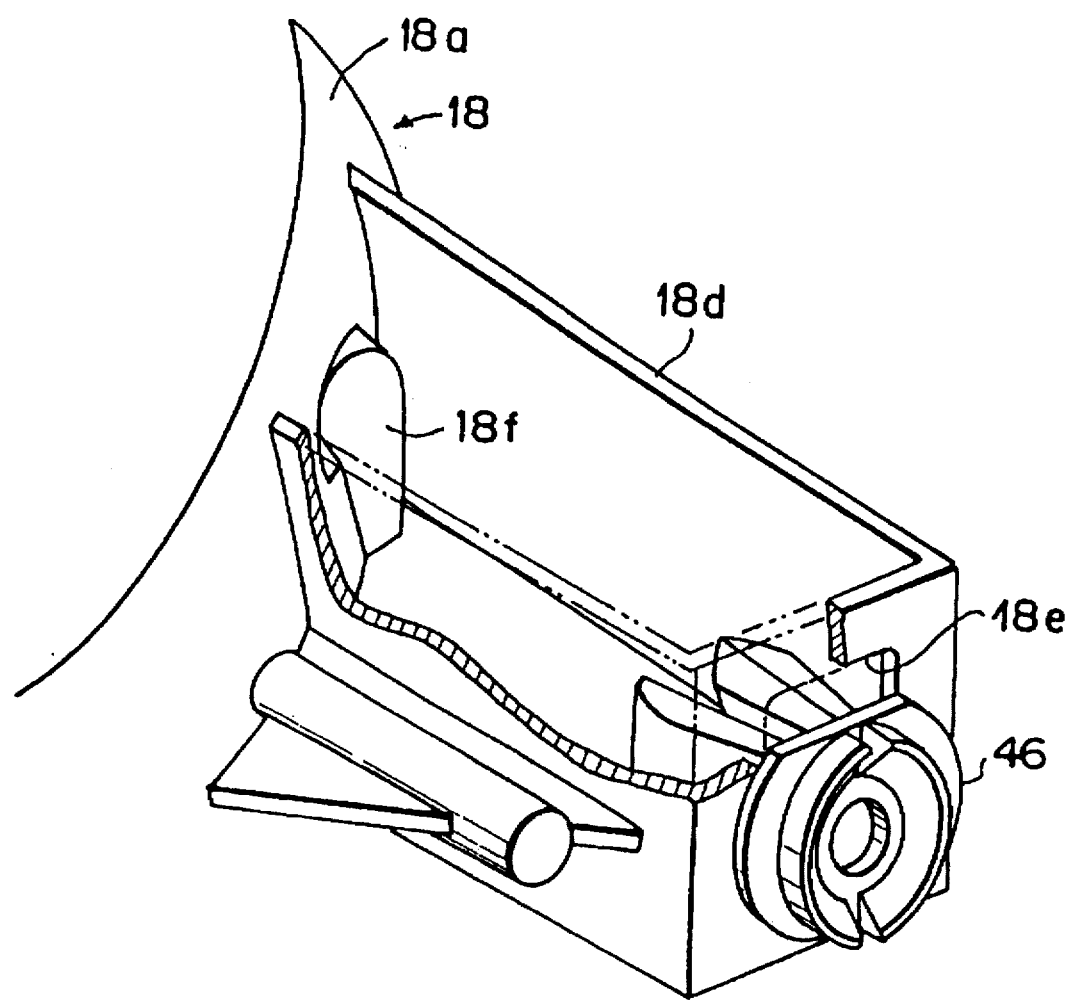
FIG. 5 is a perspective view showing an essential part of the vehicular lamp shown in FIG. 1.

FIG. 1 is a front view showing a vehicular lamp according to one embodiment of the present invention. FIGS. 2, 3 and 4 are sectional views of the vehicular lamp shown in FIG. 1 cut along lines II—II, III—III and IV—IV, respectively, and FIG. 5 is a perspective view showing an essential part of the vehicular lamp shown in FIG. 1.

The lamp shown in the figures is a foglamp housed in a front-right part of a vehicle. Not shown in the figures, a left foglamp has a structure of bilateral symmetry.

A foglamp 10 is designed to have an aiming mechanism of a reflector movable type. A reflector 18 is housed in a chamber 16 defined by an outer lens 12 and a lamp body 14 and supported therein vertically tiltably. That is, the reflector 18 is coupled to the lamp body 14 vertically tiltably at points A and B shown in FIG. 1, whereas the reflector is coupled thereto at a point C to be displacable in the front-rear direction. When a force in the front-rear direction is applied to the reflector 18 at the point C, the reflector 18 tilts vertically around a horizontal axis connecting between the point A and point B. The aiming mechanism will be described in more detail at a later part of the description.

Figure 6:
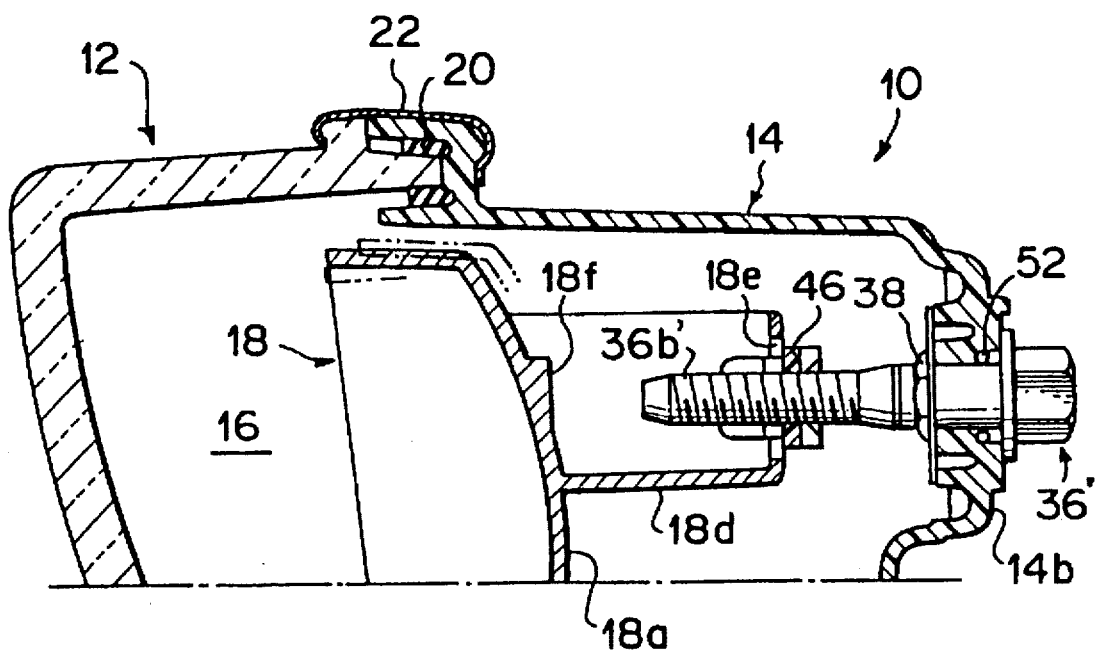
FIG. 6 is a partial sectional view showing an arrangement of an aiming screw according to the present invention.
Figure 7A:
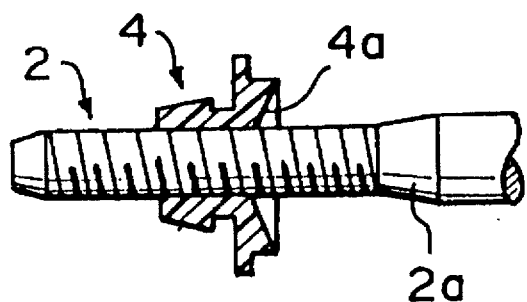
FIGS. 7A, 7B and 7C are views showing a conventional aiming restriction structure.
Figure 7B:
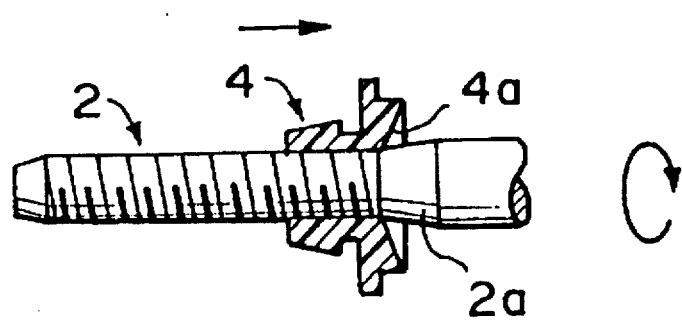
Figure 7C:
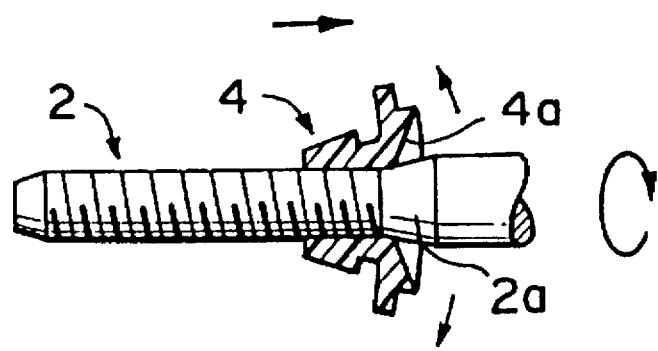

As best shown in FIGS. 4 and 6, the outer lens 12 is coupled to the lamp body 14 by an adhesive seal agent 20 applied to an entire periphery of a base end part of the lens. In addition, the outer lens 12 is secured to the lamp body 14 by clip members 22 disposed at two upper portions and one Lower portion of the base end part of the lens.

The lamp body 14 is mounted to a vehicle body through, as shown in FIG. 1, a pair of upper and lower bosses 24 formed integrally with the lamp body at an inner portion in the widthwise direction of the vehicle and through a screw 28 screw-engaging with a bracket 26 formed integrally with the lamp body at an outer portion in the widthwise direction of the vehicle. Further, as depicted in FIGS. 2 and 3, the lamp body 14 is also formed at a rear part thereof with a bulb opening 14a, and a cover 32 in which a harness assembly is installed mounts on the bulb opening through an O-ring 34.

Moreover, as shown in FIG. 4, an aiming screw supporting member 14b is formed on a rear wall of the lamp body 14 at an upper part thereof corresponding to the point C shown in FIG. 1. The aiming screw supporting member 14b rotatably supports an aiming screw 36 serving as a shaft member extending in the front-rear direction. Further, a boss section 14c, acting as a fulcrum during the aiming operation, is formed on the rear wall of the lamp body 14 at the lower part thereof corresponding to the point A shown in FIG. 1. In addition, though not illustrated in the figures, another boss section is formed at a position corresponding to the point B.

As best shown in FIG. 4, the aiming screw 36 is provided with a head part 36a having a rest part and a threaded part 36b having a length of two-third of the total length of the screw. The aiming screw 36 is engaged with the lamp body 14 by the rotation pair as follows. That is, the aiming screw 36 is inserted completely in a hole formed in the aiming screw supporting member 14b of the lamp body 14 from the rear side thereof through an O-ring 52. Thereafter, a ring-shaped push-on fix 38 is press-fitted on the aiming screw 36 from the front side until it comes into contact with the aiming screw supporting member 14b so that the push-on fix 38 is prevented from detaching. The aiming screw 36 is thus linked to the lamp body 14 in such a manner that the screw is only allowed to rotate.

As shown in FIGS. 2 and 3, the reflector 18, which is formed by the aluminum die casting, is formed integrally with a reflective surface forming part 18a and a socket base part 18b for mounting the bulb 40. Further, a shade mounting part 18c is formed above the socket base part 18b for securing a shade 42 to the reflector 18 through a screw 44.

Moreover, as shown in FIG. 4, an aiming bracket part 18d is formed integrally with the reflector 18 at a position above the reflective surface forming part 18a, which position corresponds to the point C shown in FIG. 1. The aiming bracket part 18d extends rearward for a predetermined dimension from the reflective surface forming part 18a. The aiming bracket part 18d is provided on a rear end wall thereof with a rectangular hole 18e fitting therein a self-locking nut 46 which engages with the aiming screw 36. As depicted in more detail in FIG. 5, the rectangular hole 18e of the reflector 18 performs to prevent the self-locking nut 46 from rotating and from detaching from the aiming bracket part 18d. Also, the rectangular hole 18e is designed to be elongated in the up-down direction to absorb the change of distance between the points A and C due to the tilting motion of the reflector 18.

As shown in FIGS. 4 and 5, on the other hand, an aiming screw stopper 18f is formed on a rear surface of the reflective surface forming part 18a at a position in front of the aiming screw 36 in the axial direction thereof. The aiming screw stopper 18f is formed with a plane extending substantially perpendicular to the axial direction of the aiming screw 36. FIG. 4 shows a condition where the tip end part of the aiming screw 36 contacts with the aiming screw stopper 18f. In the condition shown in FIG. 4, when the aiming screw 36 is rotated in the losing direction the reflector 18 starts to tilt downward. The aiming mechanism according to the present invention is designed so that the maximum tiltable angle is not less than 4°. On the other hand, in the condition shown in FIG. 4, even if the aiming screw 36 is further rotated strongly in the tightening direction, the reflector 18 does not tilt upward further.

The optical system of the foglamp 10 determines that the direction of the main optical axis is 3° lower than the horizontal line. However, in consideration of the irregularity in inclination of the vehicle in the front-rear direction thereof when the foglamp is installed in the vehicle body, according to the present embodiment, the direction of the main optical axis of the foglamp is determined 2° lower than the horizontal line under the condition where the tip end of the aiming screw 36 contacts with the aiming screw stopper 18f. Accordingly, if the reflector 18 is operated to tilt downward by rotating the aiming screw 36 in the loosing direction, the main optical axis of the foglamp 10 is adjustable up to 6° at maximum from the horizontal line as illustrated by two-dotted line in FIG. 4.

As shown in FIG. 4, a step part 18g is formed under the reflective surface forming part 18a at a position corresponding to the point A shown in FIG. 1. A screw 48 is inserted into a hole formed in the step part 18g and screw-engages with a hole formed in the boss section 14c so that the reflector 18 is secured to the lamp body 14 at the point A. The screw-engagement is accomplished through a spacer 50 which is previously mounted on the boss section 14c. The spacer 50 is formed from a silicone material which is deformed elastically so that the reflector is allowed to tilt by rotating the aiming screw 36 while the reflector 18 is secured to the lamp body 14.

On the other hand, as shown in FIG. 1, a step part 18h is also formed at a position corresponding to the point B as similar to the step part 18g. Though the step part 18h does not project frontward with respect to the reflective surface forming part 18a as the step part 18g but projects rearward, so that the step part 18h also performs as another fulcrum similar to that at the point A.

As described above, according to the present invention, since the reflector 18 is operated to tilt upward for a predetermined angle position, the aiming screw stopped 18f formed on the reflector 18 comes into abutment against the tip end part of the aiming screw 36 to thereby inhibit the further tilting motion of the reflector, the reflector 18 is sufficiently prevented from tilting beyond the predetermined acceptable angle even though the aiming screw rotates further strongly.

Owing to the structure of the invention, an optical axis of the reflector 18 can be precluded from directing to an undesirable direction from a point of view of the light distribution characteristics of foglamp due to the excessive tilting motion of the reflector.

Moreover, because the reflector 18 is formed by aluminum die casting, an accurate aiming screw stopper 18f having high rigidity can be formed integrally with the reflective surface forming part 18a. That is, the aiming screw stopper 18f can be formed accurately to have a plane extending substantially perpendicular to an axis of the aiming screw 36. In addition, the aiming screw stopper 18f can be formed without deteriorating the reflection property of the reflector 18 though the aiming screw stopper 18f is located at a rear surface of the reflective surface forming part 18a. Further, since the aiming screw stopper has high rigidity, the aiming screw stopper would be hardly ground down by the aiming screw even if the aiming screw is further rotated strongly after coming into abutment against the aiming screw stopper. For this reason, the reflector can be prevented further assuredly from tilting further beyond the predetermined acceptable angle position. The tip end part of the aiming screw 36 may desirably be made a complete flat in order to suppress the possibility of the problem that the aiming screw stopper 18f is ground down by the aiming screw.

Furthermore, according to the present invention, it is easy to change the predetermined angle position where the aiming screw stopper 18f abuts against the tip end part of the aiming screw 36 by varying the length of the aiming screw 36. For example, as shown in FIG. 6, by using an aiming screw 36' having a threaded part 36b' which is shorter than the threaded part 36b of the aiming screw 36, the maximum tilting angle of the reflector 18 directing upward can be designed larger as illustrated by two-dotted line.

Accordingly, even though the regulation which requires angle range for aiming adjustment is different in each destination where the lamp is used, for example, an angle range of 4° in each upper and lower direction with respect to the horizontal line is required in the United States, it is easy to meet the requirement in each regulation by preparing different length of the aiming screw for the respective destination, without changing the other parts or components of the foglamp. Moreover, by using aiming screws of the different length, many parts and components can be commonly used to the other types of lamps than the foglamp such as a driving lamp having the different light distribution characteristics.

It should be understood that the form of the invention herein shown and described is to be taken as a preferred example of the invention and that various changes in the shape, size and arrangement of parts may be resorted to without departing from the spirit of the invention or the scope of the subjoined claims.

What is claimed is:

1. A vehicular lamp having an aiming mechanism, comprising: a reflector;

a member for tiltably supporting said reflector;

an aiming screw for driving said reflector to tilt by rotating, said aiming screw having a tip end and a predetermined length, said screw linking to said reflector supporting member by a rotation pair while linking to said reflector by a screw pair; and an aiming screw stopper which comes into abutment against the tip end part of said aiming screw when said reflector tilts for up to a predetermined angle position.

2. The vehicular lamp according to claim 1, wherein said aiming screw stopper is formed on a rear side surface of a reflective surface forming section of said reflector.

3. The vehicular lamp according to claim 1, wherein said aiming screw stopper comprises a plane extending substantially perpendicular to an axis of said aiming screw.

4. The vehicular lamp according to claim 1, wherein said reflector tilts in the up-down direction.

5. The vehicular lamp according to claim 1, wherein said reflector is formed by die casting.

6. The vehicular lamp according to claim 5, wherein said reflector is formed by aluminum die casting.

7. The vehicular lamp according to claim 1, wherein said reflector is for a foglamp.

8. A vehicular lamp having an aiming mechanism, comprising:

a stationary member secured to a vehicular body;

a reflector tiltably supported with respect to the stationary member;

an aiming screw having a tip end and a driving end and being rotatably supported by said stationary member, said aiming screw threadably engaging with said reflector; and an aiming screw stopper which comes into abutment against said aiming screw tip end when said reflector tilts for a predetermined angle position.

9. The vehicular lamp according to claim 8, wherein said reflector is rotatably supported by a lamp body.

10. The vehicular lamp according to claim 9, further comprising an aiming screw supporting member formed on a rear wall of said lamp body.

11. The vehicular lamp according to claim 10, wherein said aiming screw is inserted completely in a hole formed in said aiming screw supporting member from a rear side thereof through an O-ring, and then a ring-shaped push-on fix is press-fitted on said aiming screw from a front side until it comes into contact with said aiming screw supporting member.

12. The vehicular lamp according to claim 8, wherein said reflector is rotatably supported by a lamp housing of the vehicle.

13. The vehicular lamp according to claim 8, wherein said aiming screw stopper is formed integrally with said reflector.

14. The vehicular lamp according to claim 8, wherein said aiming screw stopper is formed separately from said reflector.

15. The vehicular lamp according to claim 8, wherein said reflector is formed by aluminum die casting.

16. The vehicular lamp according to claim 8, wherein said lamp has a main optical axis and a direction of the main optical axis of the lamp is determined 2° lower than a horizontal line under a condition where a tip end of said aiming screw contacts with said aiming screw stopper.

17. A vehicular lamp having an aiming mechanism, comprising:

a stationary member secured to a vehicular body;

a reflector tiltably supported with respect to the stationary member;

an aiming screw having a tip end and being rotatably supported by said stationary member, said aiming screw threadably engaging with said reflector; and an aiming screw stopper which comes into abutment against said aiming screw tip end when said reflector tilts for a predetermined angle position wherein said reflector comprises:

a reflective surface forming part;

a socket base part for mounting a lamp bulb;

a shade mounting part formed at a predetermined orientation with respect to said socket base part for securing a shade to said reflector using a screw;

an aiming bracket part formed integrally with said reflector at a position separated from said reflective surface forming part, said aiming bracket part extending rearward for a predetermined dimension from said reflective surface forming part; and a rectangular hole disposed on a rear end wall of said aiming bracket part.

18. The vehicular lamp according to claim 17, further comprising a self-locking nut fitting in said rectangular hole of said reflector.

19. The vehicular lamp according to claim 17, wherein said rectangular hole is elongated in the up-down direction.

20. The vehicular lamp according to claim 17, wherein said reflector further comprises a step part formed under said reflective surface forming part, said step part being secured to the stationary member through a spacer formed from a silicone material.

* * * * *